United States Patent Office 2,862,894

Patented Dec. 2, 1958

2,862,894

PREPARATION OF ANION-EXCHANGE RESINS CONTAINING WEAKLY BASIC AND STRONGLY BASIC FUNCTIONAL GROUPS

Jesse C. H. Hwa, Levittown, Pa., assignor to Rohm & Haas Company, Philadelphia, Pa., a corporation of Delaware No Drawing. Application November 28, 1956 Serial No. 624,744

6 Claims. (Cl. 260—2.1)

This invention relates to the preparation of insoluble anion-exchange resins which contain both weakly basic and strongly basic functional groups. It has particular reference to a new and greatly improved process for preparing resins of the general mixed functional type which I have disclosed in my co-pending application Serial No. 431,278, filed on May 20, 1954, said resins containing strongly basic, quaternary ammonium, anion-adsorbing groups as well as weakly basic, primary, secondary, or tertiary amino anion-adsorbing groups.

In the process which I have disclosed in the said co-pending application a three-step operation is employed. Insoluble polystyrene resin beads are first made by reacting styrene with a cross-linking agent such as divinylbenzene. These beads are then chloromethylated. The product of this chloromethylation step is then aminated, as with a di-tertiary amine, to form the final resin which has both the strongly basic and the weakly basic functional groups. By contrast, the present invention provides a two-step operation which is much cheaper, simpler, and faster to perform. The starting material used is a monochlorohydrin ester of the acrylic type acids. This ester is reacted with a cross-linking agent, such as divinylbenzene, and then directly aminated with the di-tertiary amine to form the final, mixed functional group resin.

In general, it may be said that the products of the invention are made by reacting a polyamine with an insoluble, cross-linked polymer of a monochlorohydrin ester of acrylic acid in accordance with the scope which will be defined later. The polyamine must contain at least one tertiary amino group; the other(s) can be primary, secondary, or tertiary groups.

The process can be readily understood from a consideration of a preferred embodiment of this invention; namely the preparation of an anion-exchange resin containing strongly basic, quaternary ammonium, anion-adsorbing groups by the reaction of tetramethylethylenediamine and a cross-linked polymer of the chlorohydrin methacrylate as illustrated below:

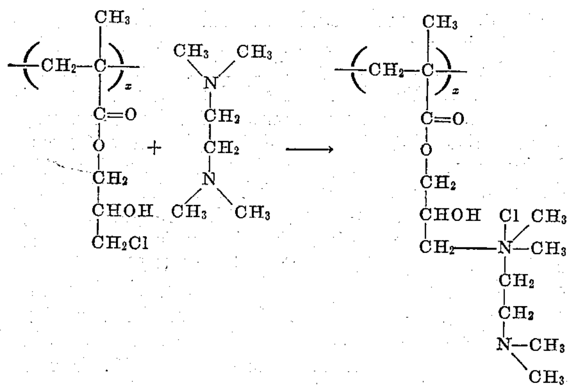

The character $x$ is employed in the conventional way to indicate that the structural unit shown is only one of many such units joined together in the insoluble polymeric chlorohydrin ester.

The scope of the invention is indicated by the following representation:

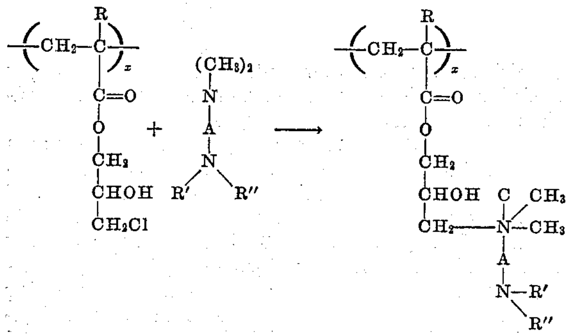

In the above formulae, R represents an atom of hydrogen or an alkyl group of one to four carbon atoms, R′ and R″ each represents a methyl or ethyl group or a hydrogen atom, and A represents an alkylene group of from two to six carbon atoms—preferably an ethylene or propylene group—or the group

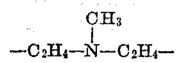

Instead of the ester of acrylic acid it is also satisfactory to use the analogous ester of an alpha-substituted acrylic acid, such as methacrylic acid.

It is to be noted that the chlorine atom of the polymeric chlorohydrin ester reacts with the tertiary amine portion of the polyamine during the reaction but that the rest of the macromolecule, including the group R, remains inert and intact. Furthermore, the organic groups attached to the tertiary amino nitrogen atom are not altered. As stated above, all that is required of the polyamine is that it contain at least one tertiary amine group, in which case quaternary ammonium groups become attached to the insoluble macromolecule. As a consequence, the product acquires the properties of a strongly basic anion-exchange resin. The rest of the polyamine, represented by $$-N\begin{matrix} R' \\ R'' \end{matrix}$$

(in which the characters R′ and R″ are defined above), remains essentially intact and imparts weakly basic anion-exchange properties. In any case where the polyamine is a di-tertiary amine, such as tetramethylethylenediamine, a small portion of the diamine (up to 10%) reacts with two chlorine atoms of the chlorohydrin polymer at both nitrogen atoms simultaneously. The chloride anion which is attached to the insoluble resin is capable of exchange with other anions such as OH— etc. When the resin is converted to the hydroxide form, it acquires the properties of a strongly basic anion-exchange resin which is capable of splitting neutral salt solutions.

The monomeric chlorohydrin esters which are polymerized, cross-linked, and then reacted with the polyamine described above to produce the anion-exchange resins of this invention, include the chlorohydrin esters of acrylic acid, alpha-methylacrylic acid, alpha-ethylacrylic acid, the isomeric alpha-propylacrylic acids, and the isomeric alpha-butylacrylic acids. These monomeric esters are known and can conveniently be prepared by reacting a salt of the acid with epichlorohydrin, for example according to the method of U. S. Patent No. 2,335,813 of November 30, 1943. These esters, which it should be understood can be made by methods other than the one disclosed in that patent, can have any one of the following structures:

$$CH_2{=}C(R){-}COOCH_2CHOHCH_2Cl$$

or $$CH_2{=}C(R){-}COOCH_2CHClCH_2OH$$

or

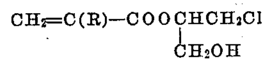

in which structures R represents a member of the class consisting of a hydrogen atom and an alkyl group containing one to four carbon atoms.

The chlorohydrin esters are polymerized together with a cross-linking agent so as to produce insoluble polymeric products. Cross-linking agents are well known and embrace those compounds which are copolymerizable with the chlorohydrin esters and which contain a plurality of non-conjugated vinylidene groups, $CH_2{=}C{<}$. Currently, divinylbenzene is the most common cross-linking agent but others which are operable include: divinylpyridine, divinyltoluenes, divinylnaphthalenes, diallyl phthalate, ethylene glycol diacrylate or dimethacrylate, divinylxylene, divinylethylbenzene, divinylsulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicone, diallyl silicate, triallyl tricarballylate, triallyl aconitate, triallyl citrate, triallyl phosphate, N,N'-methylenediacrylamide, N,N' - methylenedimethacrylamide, 1,2-di-(α-methylmethylene sulfonamido)-ethylene, trivinylbenzene, trivinylnaphthalene, and polyvinylanthracenes.

By varying the amount of the cross-linking agent used in the preparation of the copolymer, variations can be made in the physical properties of the polymeric material which carry through to the finished product. Thus, for example, higher amounts of cross-linker make for products of higher density. In general, the amount of copolymerizable cross-linking agent can vary from 0.1 to 40% of the total polymerizable materials on a molar basis. In practice, however, it is preferred to use at least 0.5%; and for most purposes no benefit is derived from using over about 10%.

The polymeric base material can be formed by any of the known polymerization processes such as polymerization in mass, in solvents for the monomeric materials or in emulsion or suspension in a liquid which is not a solvent for the monomers. The last is the preferred method because it produces the polymer in the form of small spheroids or beads, the size of which can be regulated and controlled.

In following the preferred method it is advantageous to thin out the organic monomer by adding thereto an organic, miscible, inert diluent which is water insoluble as, for example, toluene, benzene, etc. At the end of the polymerization the diluent will be imbibed by the insoluble resin. The resin which contains the diluent is suitable for amination without the prior removal of the diluent.

The polymerization of the chlorohydrin ester and the copolymerizable cross-linking agent is accelerated by means of well known catalysts. These catalysts include ozone; ozonides; organic peroxidic compounds such as acetyl peroxide, lauroyl peroxide, stearoyl peroxide, tert-butyl hydroperoxide, benzoyl peroxide, tert-butylperbenzoate, ditert-butyl diperphthalate, ditert-butyl peroxide, and the barium salt of tert-butyl hydroperoxide, hydrogen peroxide; azo compounds such as azobisobutyronitrile; and the so-called "per salts" such as the water-soluble perborates, persulfates, and perchlorates. The catalysts are employed in suitable amounts ranging from 0.1 to about 2.0% based on the weight of the monomeric material to be polymerized.

The polyamines which react with the cross-linked and insoluble chlorohydrin esters are best represented, as above, by the general formula:

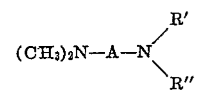

in which R', R'', and A have already been defined. The most satisfactory tertiary amines which are employed are typified by the following: N,N,N',N'-tetramethylethylenediamine, N,N-diethylethylenediamine, N,N,N'-trimethylethylenediamine, and N,N,N',N'',N''-pentamethyldiethyldiethylenetriamine, and N, N-dimethylpropylenediamine. In place of these tertiary amines it is possible to use other amines such as ammonia, primary and secondary amines in which case anion-exchange resins of quite different characteristics will be obtained, as has been disclosed in my co-pending application for Letters Patent, Serial No. 624,742, filed November 28, 1956. It is also possible to use simple tertiary amines in which case anion-exchange resins of simple quaternary ammonium type will be obtained as disclosed in my co-pending application for Letters Patent, Serial No. 624,743, filed November 28, 1956. The reaction of the amine and the polymeric ester is best carried out as follows: Particles of the insoluble resin (which can contain some of the inert diluent if such a material was employed as described above) are suspended by agitation in a liquid which is a solvent for the amine, such as water or an alcohol, dioxane, toluene or the like, and then agitating the reaction mixture while it is maintained at a temperature from about 0° C. to the refluxing temperature. Since, however, the process is decidedly less efficient at the lower temperatures, it is much preferred to employ a temperature from about 50° C. to the boiling point of the reaction mixtures.

While a catalyst is not necessary, it is nevertheless suggested that one be employed. Catalysts which are recommended include iodides of alkali metals such as sodium iodide, potassium iodide, etc.

When the reaction is complete, the resinous product containing both quaternary ammonium groups and weakly basic amino groups is separated from the reaction mixture as, for example, by steam distillation, decantation, or filtration, and is washed free of contaminants.

The following examples, in which all parts are by weight, serve to illustrate the process of this invention which in its broader aspects is a novel method of converting insoluble, cross-linked polymers of chlorohydrin esters of acrylic and alpha-substituted acrylic acids into anion-exchange resins containing, as polar, anion-adsorbing groups, quaternary ammonium and weak base groups.

*Example 1*

(*a*) Into a container equipped with thermometer, mechanical stirrer, and reflux condenser were poured 3000 parts of water containing 0.5% of a commercial dispersing agent. To this stirred solution was added a mixture of 1450 parts of monomeric 3-chloro-2-hydroxypropyl methacrylate, 30 parts of divinylbenzene, 22 parts of ethyl styrene and 15 parts of benzoyl peroxide. The mixture was then filtered; the hardened, insoluble beads of polymeric, cross-linked 3-chloro-2-hydroxypropyl methacrylate were washed thoroughly first with water and then with ethanol. After drying at 105° C. for five hours, the beads were uniform, individual and hard and had an average estimated size of 0.2 mm. diameter. The yield of the dry product was 1375 parts, corresponding to 91.5% of the theoretical. The beads had 17.1% chlorine by analysis. The described process is also suitable for the preparation of insoluble, cross-linked polymers of all the chlorohydrin esters described above.

(*b*) In a similar manner a monomer mixture consisting of 669 parts of 3-chloro-2-hydroxypropyl methacrylate, 31 parts of ethylene glycol dimethacrylate, 7 parts of benzoyl peroxide, and 300 parts of toluene was converted to toluene-swollen insoluble beads by suspension polymerization in 2500 parts of water. After thorough washing with water, the spherical beads still retained the imbibed toluene solvent and could be used without drying. The toluene-laden, water wet resin contained 48.4% solids.

*Example 2*

In a container equipped with thermometer, mechanical stirrer, and a reflux condenser were introduced 135 parts of the dried cross-linked polymeric 3-chloro-2-hydroxypropyl methacrylate prepared by the method given in Example 1(*a*), and 1000 parts of ethylene dichloride. The mixture was stirred at 60° C. for one hour after which excess ethylene dichloride was drained off. A mixture of 500 parts of water and 130 parts of 69% aqueous N,N'-tetramethylethylenediamine solution was then added. The contents were stirred and refluxed for eight hours. The ethylene dichloride was removed by steam distillation and the beads were thoroughly washed with water. 457 parts of the moist product was obtained, which contained 11.4% chlorine, and 6.9% nitrogen (on dry weight basis). The resin had the ion-exchange characteristics of both strong base and weak base types. It had 3.23 milliequivalents per gram dry and 1.02 milliequivalents per milliliter wet of salt splitting anion capacity; and 5.31 milliequivalents per gram dry and 1.68 milliequivalents per milliliter wet of total anion-exchange capacity, the difference between the salt splitting and the total anion-exchange capacities being the weak base capacity. The product also had 44.1 lbs./cu. ft. of density and 44.8% solids.

*Example 3*

In an identical manner as shown in Example 2, a mixed strong base and a weak base type ion-exchange resin was obtained by reacting a cross-linked 3-chloro-2-hydroxypropyl methacrylate-3% divinylbenzene intermediate, prepared by the method of Example 1(*a*), with N,N'-tetramethyltrimethylenediamine. The product had these properties: 54.6% solids; 42.2 lbs./cu. ft density; 4.12 milliequivalents per gram dry and 1.52 milliequivalents per milliliter wet of total anion-exchange capacity; and 3.29 milliequivalents per gram dry and 1.21 milliequivalents per milliliter wet of salt splitting anion capacity.

*Example 4*

In an identical manner as shown in Example 2, a mixed strong base and a weak base type ion-exchange resin was obtained by reacting a cross-linked 3-chloro-2-hydroxypropyl acrylate-4% divinylbenzene intermediate, prepared by the method of Example 1(*a*), with N,N'-tetramethylethylenediamine. The product had these properties: 58.0% solids; 41.4 lbs./cu. ft. density; 2.96 milliequivalents per gram dry of salt splitting anion capacity; and 4.47 milliequivalents per gram dry of anion-exchange capacity. On dry basis, the product had 11.3% chlorine and 6.2% nitrogen.

*Example 5*

(*a*) In a container equipped with thermometer, mechanical stirrer, and reflux condenser were poured 750 parts of water containing 0.5% of a commercial dispersing agent. To this stirred solution was added a mixture of 203 parts of monomeric 3-chloro-2-hydroxypropyl methacrylate, 4.0 parts of divinylbenzene, 3.4 parts of ethyl styrene, 2.1 parts of benzoyl peroxide, and 90 parts of toluene. The mixture was stirred for ten minutes at 40° to 50° C. after which it was heated to 80° to 85° C. and held there for five hours. The mixture was then filtered. The hardened, insoluble beads which contained the imbibed toluene was thoroughly washed with water. The toluene-swollen resin which was also moist with water weighed 406 parts, which had 56.6% solids and 17.1% chlorine (on dry weight basis).

(*b*) In a conventional equipment, a mixture of 163 parts of the toluene-swollen resin prepared by the method just described, 97 parts of N,N-dimethylethylenediamine, 500 parts of water, and 0.5 part of sodium iodide was refluxed for five hours. Toluene was removed by steam distillation and the resin was washed thoroughly with water. The product weighed 270 parts and had 32.5% solids, 40.4 lbs./cu. ft. density, 5.2% chlorine and 7.1% nitrogen by analysis. It had 1.22 and 5.39 milliequivalents per gram dry of salt splitting and total anion-exchange capacities, respectively.

I claim:

1. A process for preparing an anion-exchange resin which contains both weakly basic anion-adsorbing groups and strongly basic quaternary ammonium anion-adsorbing groups which comprises reacting a polyamine of the general formula

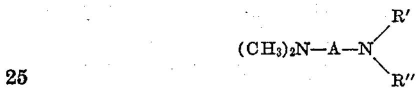

$$(CH_3)_2N-A-N\begin{matrix} R' \\ R'' \end{matrix}$$

wherein R' and R'' are each selected from the class consisting of a methyl group, an ethyl group and a hydrogen atom, and A represents an alkylene group of from two to six carbon atoms, together with an insoluble, cross-linked, resinous product which is a copolymer of a mixture containing (*a*) 90 to 99.5% of a chlorohydrin ester which is one of the class consisting of compounds designated by the following formulae:

(*a*) $CH_2{=}C(R){-}COOCH_2CHClCH_2OH$ (*b*) $CH_2{=}C(R){-}COOCH_2CHOHCH_2Cl$ (*c*) $CH_2{=}C(R){-}COOCH(CH_2OH)CH_2Cl$ in which R represents a member of the class consisting of a hydrogen atom and an alkyl group containing one to four carbon atoms, and (*b*) 0.5 to 10% of a compound which is copolymerizable with said ester and which contains at least two non-conjugated vinylidene groups, $CH_2{=}C{<}$.

2. A process for preparing an anion-exchange resin which contains both weakly basic anion-adsorbing groups and strongly basic quaternary ammonium anion-adsorbing groups which comprises reacting N,N,N',N'-tetramethylenediamine together with an insoluble, cross-linked, resinous product which is a copolymer of a mixture containing 90 to 99.5% of chlorohydrin methacrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol, diacrylate, ethylene glycol dimethacrylate, divinylxylene, divinylethylbenzene, divinylsulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-di-(α-methylmethylene sulfonamido)-ethylene, trivinylbenzene, trivinylnaphthalene, and polyvinylanthracenes.

3. A process for preparing an anion-exchange resin which contains both weakly basic anion-adsorbing groups and strongly basic quaternary ammonium anion-adsorbing groups which comprises reacting N,N-diethylethylenediamine together with an insoluble, cross-linked, resinous product which is a copolymer of a mixture containing 90 to 99.5% of chlorohydrin methacrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-di-($\alpha$-methylmethylene sulfonamido)-ethylene, trivinylbenzene, trivinylnaphthalene, and polyvinylanthracenes.

4. A process for preparing an anion-exchange resin which contains both weakly basic anion-adsorbing groups and strongly basic quaternary ammonium anion-adsorbing groups which comprises reacting N,N,N'-trimethylethylenediamine together with an insoluble, cross-linked, resinous product which is a copolymer of a mixture containing 90 to 99.5% of chlorohydrin methacrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-di-($\alpha$-methylmethylene sulfonamido)-ethylene, trivinylbenzene, trivinylnaphthalene, and polyvinylanthracenes.

5. A process for preparing an anion-exchange resin which contains both weakly basic anion-adsorbing groups and strongly basic quaternary ammonium anion-adsorbing groups which comprises reacting N,N,N',N'-tetramethylenediamine together with an insoluble, cross-linked resinous product which is a copolymer of a mixture containing 90 to 99.5% of chlorohydrin acrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-di-($\alpha$-methylmethylene sulfonamido)-ethylene, trivinylbenzene, trivinylnaphthalene, and polyvinylanthracenes.

6. A process for preparing an anion-exchange resin which contains both weakly basic anion-adsorbing groups and strongly basic quaternary ammonium anion-adsorbing groups which comprises reacting N,N-diethylethylenediamine together with an insoluble, cross-linked, resinous product which is a copolymer of a mixture containing 90 to 99.5% of chlorohydrin acrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol diacrylate, ethylene glycol, dimethacrylate, divinylxylene, divinylethylbenzene, divinylsulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-di-($\alpha$-methylmethylene sulfoamido)-ethylene, trivinylbenzene, trivinylnaphthalene, and polyvinylanthracenes.

References Cited in the file of this patent

UNITED STATES PATENTS

| | | |
|---|---|---|
| 1,860,098 | Jaeger | May 24, 1932 |
| 1,977,251 | Stallman | Oct. 16, 1934 |
| 2,129,694 | Izzard | Sept. 13, 1938 |
| 2,630,428 | Hwa | Mar. 3, 1953 |